United States Patent [19]
O'Tighearnaigh

[11] Patent Number: 5,662,720
[45] Date of Patent: Sep. 2, 1997

[54] COMPOSITE POLYCRYSTALLINE DIAMOND COMPACT

[75] Inventor: Eoin M. O'Tighearnaigh, Dublin, Ireland

[73] Assignee: General Electric Company, Pittsfield, Mass.

[21] Appl. No.: 591,879

[22] Filed: Jan. 26, 1996

[51] Int. Cl.$^6$ ................................... B24D 11/00
[52] U.S. Cl. .................. 51/295; 51/307; 51/309
[58] Field of Search ................ 51/293, 307, 309, 51/295

[56] References Cited

U.S. PATENT DOCUMENTS

| | | |
|---|---|---|
| Re. 32,380 | 3/1987 | Wentorf, Jr. et al. |
| 3,745,623 | 7/1973 | Wentorf, Jr. et al. |
| 3,767,371 | 10/1973 | Wentorf, Jr. et al. |
| 4,592,433 | 6/1986 | Dennis. |
| 4,604,106 | 8/1986 | Hall et al. |
| 4,629,373 | 12/1986 | Hall. |
| 4,784,023 | 11/1988 | Dennis. |
| 5,011,515 | 4/1991 | Frushour. |
| 5,211,726 | 5/1993 | Slutz et al. ............... 51/293 |
| 5,351,772 | 10/1994 | Smith. |
| 5,498,480 | 3/1996 | Tank et al. ............... 51/307 |

*Primary Examiner*—Deborah Jones

[57] ABSTRACT

A cutting element comprises a diamond layer and a metal carbide substrate. The diamond layer and the metal carbide substrate form an egg-carton shaped interface.

8 Claims, 3 Drawing Sheets

COMPOSITE POLYCRYSTALLINE DIAMOND COMPACT

BACKGROUND OF THE INVENTION

1. Field of the Invention

The present invention relates to a sintered polycrystalline diamond (PCD) composite for use in rock drilling, machining of wear resistant metals, and other operations which require the high abrasion resistance or wear resistance of a diamond surface. Specifically, this invention relates to such bodies which comprise a PCD layer attached to a cemented metal carbide substrate via processing at ultrahigh pressures and temperatures.

2. Prior Art

PCD compacts have been used for industrial applications including rock drilling and metal machining for many years. One of the factors limiting the success of PCD is the strength of the bond between the polycrystalline diamond layer and the sintered metal carbide substrate. For example, analyses of the failure mode for drill bits used for deep hole rock drilling show that in approximately 33 percent of the cases, bit failure or wear is caused by delamination of the diamond from the metal carbide substrate.

U.S. Pat. No. 3,745,623 (reissue U.S. Pat. No. 32,380) teaches the attachment of diamond to tungsten carbide support material. This, however, results in a cutting tool with a relatively low impact resistance. FIG. 1, which is a perspective drawing of this prior art composite, shows that there is a very abrupt transition between the metal carbide support and the polycrystalline diamond layer. Due to the differences in the thermal expansion of diamond in the PCD layer and the binder metal used to cement the metal carbide substrate, there exists a stress in excess of 200,000 psi between these two layers. The force exerted by this stress must be overcome by the extremely thin layer of cobalt which is the binding medium that holds the PCD layer to the metal carbide substrate. Because of the very high stress between the two layers, which is distributed over a flat narrow transition zone, it is relatively easy for the compact to delaminate in this area upon impact. Additionally, it has been known that declaminations can also occur on heating or other disturbances aside from impact.

One solution to this problem is proposed in the teaching of U.S. Pat. No. 4,604,106. This patent utilizes one or more transitional layers incorporating powdered mixtures with various percentages of diamond, tungsten carbide, and cobalt to distribute the stress caused by the difference in thermal expansion over a larger area. A problem with this solution is that "sweep-through" of the metallic catalyst sintering agent is impeded by the free cobalt and the cobalt cemented carbide in the mixture.

U.S. Pat. No. 4,784,023 teaches the grooving of polycrystalline diamond substrates but does not teach the use of patterned substrate designed to uniformly reduce the stress between the polycrystalline diamond layer and the substrate support layer. In fact, this patent specifically mentions the use of undercut (or dovetail) portions of substrate grooves, which contributes to increased localized stress and is strictly forbidden by the present invention. FIG. 2 shows the region of highly concentrated stresses that results from fabricating polycrystalline diamond composites with substrates that are grooved in a dovetail manner. Instead of reducing the stress between the polycrystalline diamond layer and the metallic substrate, this actually makes the situation much worse. This is because the larger volume of metal at the top of the ridge will expand and contract during heating cycles to a greater extent than the polycrystalline diamond, forcing the composite to fracture at locations 1 and 2 shown in the drawing.

The disadvantage of using relatively few parallel grooves with planar side walls is that the stress again becomes concentrated along the top and the base of each groove and results in significant cracking of the metallic substrate and the diamond layer along the edges of the top and the bottom of the groove. This cracking 3 is shown in FIG. 3. As a result, construction of a polycrystalline diamond cutter following the teachings provided by U.S. Pat. No. 4,784,023 is not suitable for cutting applications where repeated high impact forces are encountered, such as in percussive drilling, nor in applications where extreme thermal shock is a consideration.

U.S. Pat. No. 4,592,433, which teaches grooving substrates, is not applicable to the present invention since these composites do not have a solid diamond table across the entire top surface of the substrate, and thus are not subjected to the same type of delamination failure. With the top layer of diamond not covering the entire surface, these composites cannot compete in the harsh abrasive application areas with the other prior art and present invention compacts mentioned in this patent application.

U.S. Pat. No. 4,629,373 describes the formation of various types of irregularities upon a polycrystalline diamond body without an attached substrate. The purpose of these irregularities is to increase the surface area of the diamond and to provide mechanical interlocking when the diamond is later brazed to a support or placed in a metal matrix. This patent specifically mentions that stress between the polycrystalline diamond and metal substrate support is a problem that results from manufacturing compacts by a one-step process. It, therefore, suggests that polycrystalline diamond bodies with surface irregularities be attached to support matrices in a second step after fabrication at ultra-high pressures and temperatures. This type of bond is, unfortunately, of significantly lower strength than that of a bond produced between diamond and substrate metals under diamond stable conditions. Therefore, compacts made by this process cannot be used in high impact applications or other applications in which considerable force is placed upon the polycrystalline diamond table.

U.S. Pat. No. 5,011,515 describes the formation of various irregularities which are pyramidal in shape on a substrate surface such that the spacing between these irregularities being greater at the base than at the top. See FIG. 4. Although stresses between the diamond and the metal carbide support is spread over a large area comparing with the prior art cutting element. Fruschour failed to achieve the goal of uniformly distributing the stresses over the entire region. The stresses at the sharp points of the pyramidal-shaped irregulars would be substantially increased which may lead to delamination and cracking failure between the diamond and the metal carbide substrate and cracking failure within the cutting element.

U.S. Pat. No. 5,351,772 issued to Smith teaches a cutting element comprising a PDC diamond table bonded to a tungsten carbide substrate having lands thereon spaced about the perimeter of the substrate. The diamond table depth exceed the height of the substrate lands so that alldiamond cutting surface is present. See FIG. 5. Like Frushour, Smith also fails to teach uniformly spreading the stresses between the diamond and carbide support. The residual stresses would be increased at the sharp points which would lead to delamination and cracking failure within the cutting element.

3

It would be desirable to have a composite compact wherein the stress between the diamond and metal carbide substrate could be uniformly spread over a larger area and the attachment between the diamond and metal carbide strengthened such that the impact resistance of the composite tool is improved without any loss of diamond-to-diamond bonding that results from efficient sweep-through of the catalyst sintering metal.

SUMMARY OF THE INVENTION

In contrast to the prior art, the cutting element of the present invention comprises a substantially planar structure of circular cross section comprising a PDC diamond table bonded to a metal carbide substrate layer. By modification of the topography of the surface of a sintered metal carbide substrate to provide alternating convex and concave surfaces evenly distributed over the entire area of the substrate in contact with the diamond, the present invention provides a solution to the aforementioned problems. The stresses between the diamond and the metal carbide substrate is uniformly distributed throughout the entire area of the substrate in contact with the diamond while at the same time substantially increasing the area of attachment. The surface of the metal carbide substrate is changed from a flat two-dimensional area with sharp points to a three-dimensional pattern in such a manner that the percentage of diamond in the composite can be varied continuously throughout the region that exists between the metal carbide substrate and the polycrystalline diamond layer. The thickness of the transition zone can be controlled as well as cross sectional diamond percentage.

The surface topography of the metal carbide substrate can be patterned in a predetermined or random fashion, however, it is an important aspect of this invention that the mounting surface of the substrate curves upwardly and downwardly in a relatively uniform distribution. This uniformity is necessary in order to evenly distribute the stresses which arises from the difference in thermal expansion between the diamond and the metal carbide substrate material.

DETAILED DESCRIPTION OF THE INVENTION

Figure 1:
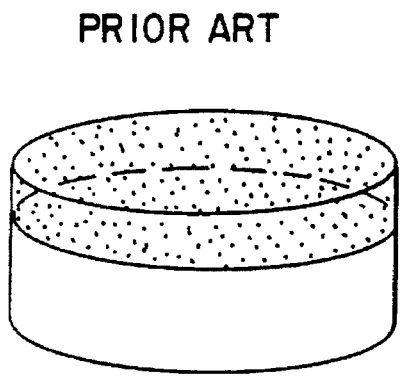
FIG. 1 is a perspective view of a prior art PCD composite compact.
Figure 2:
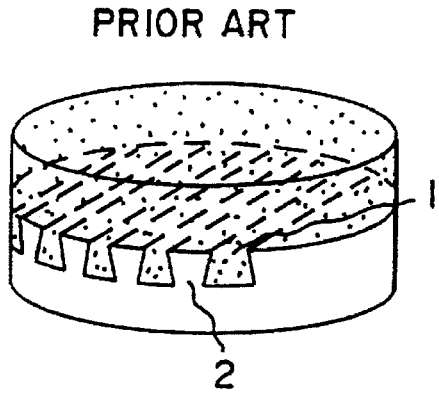
FIG. 2 is a perspective view of a prior art PCD that contains an integrally bonded substrate with undercut grooves at the diamond substrate interface.
Figure 5:
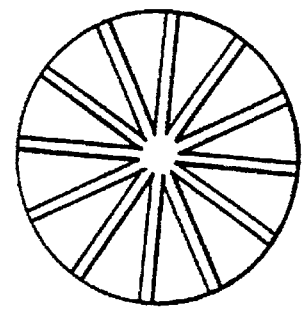
FIG. 5 is a top elevation of a prior art substrate which has radically extending raised lands on one side thereof, to and over which is formed and bonded a PCD table.
Figure 4:
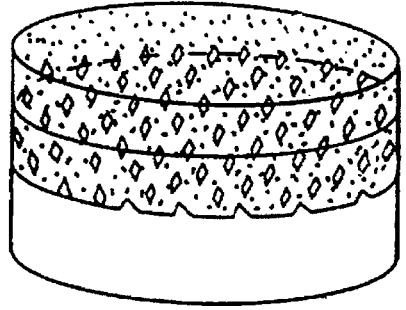
FIG. 4 is a perspective view of a prior art composite. The interface between the layers is defined by topography with irregularities having angularly disposed side walls such that the concentration of substrate material continuously and gradually decreases at deeper penetrations into diamond layer.
Figure 3:
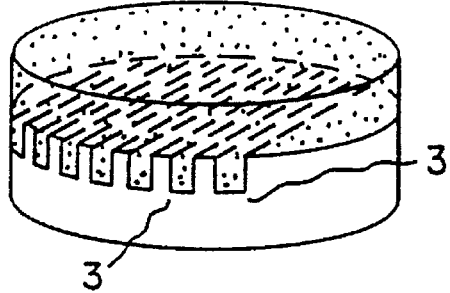
FIG. 3 is a perspective view of a prior art composite which is similar to that shown in FIG. 2, except that the side walls of the substrate grooves are perpendicular to the top surface of the compact instead of being undercut.
Figure 6A:
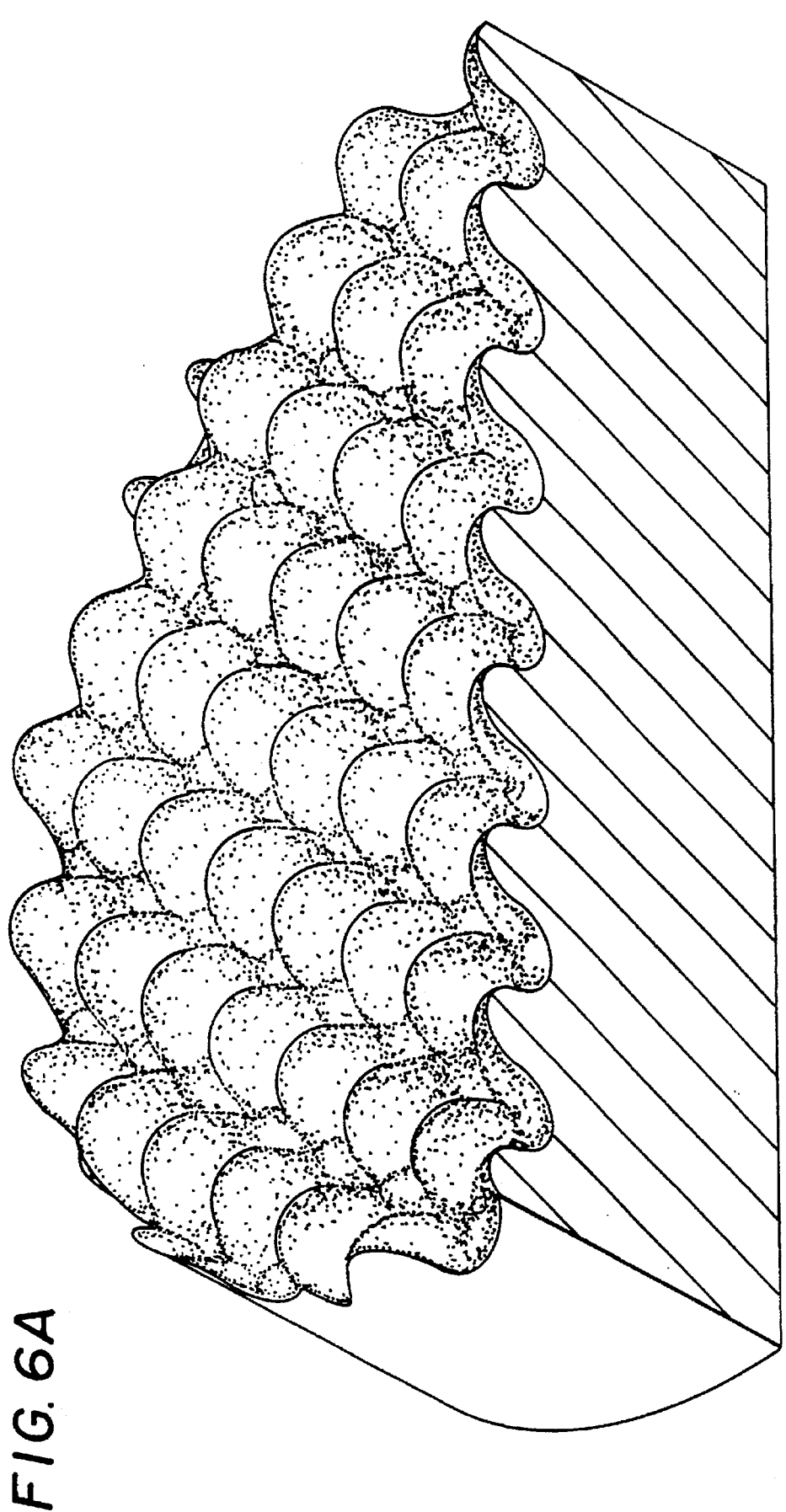
FIG. 6A and 6B are perspective views of the metal carbide substrates of the present invention.
Figure 6B:
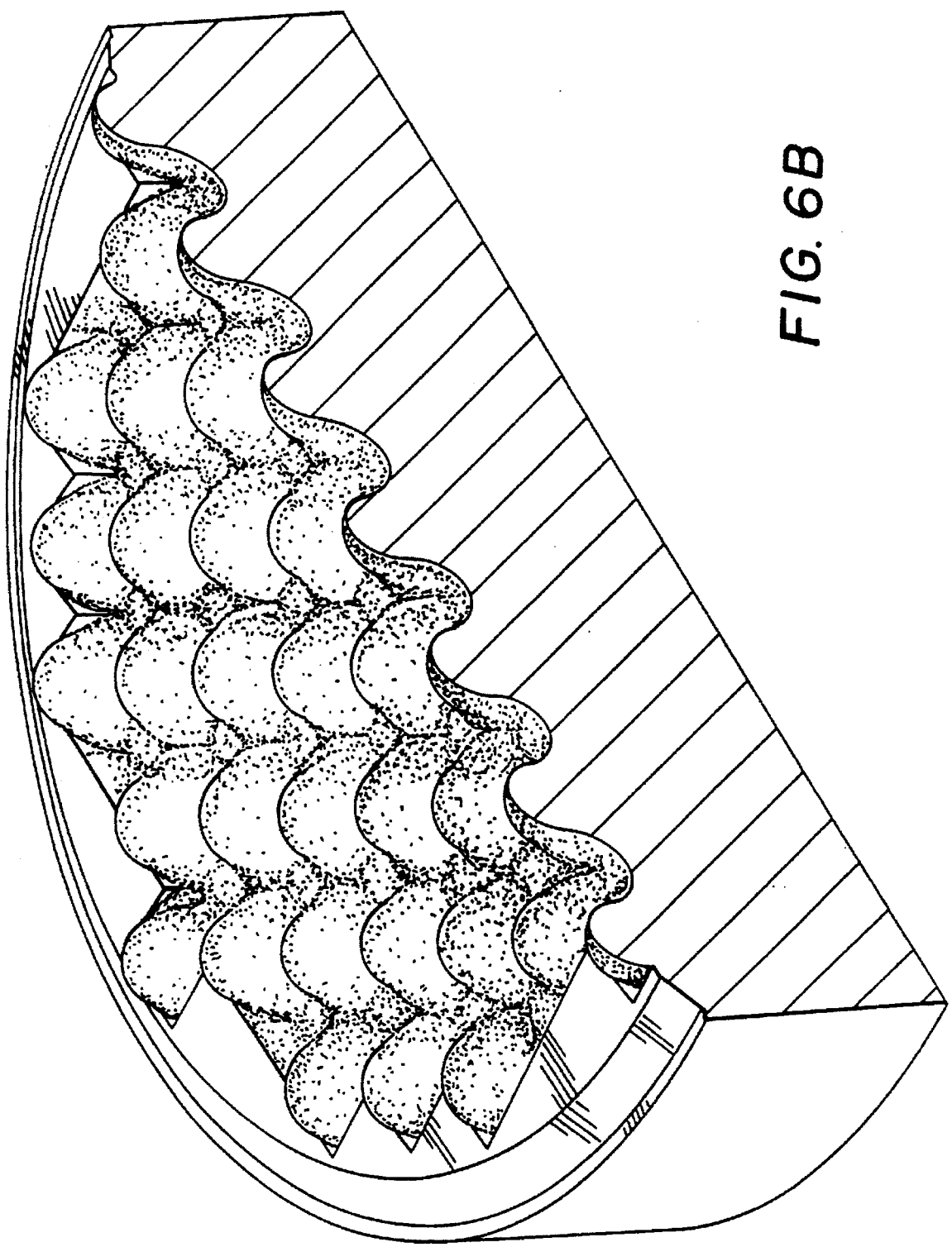

FIGS. 6A and 6B show embodiments of this invention. These views show the interface between the PCD diamond layer and the metal carbide substrate. The interface is continuous egg-carton shaped which comprises alternating convex and concave surfaces uniformly distributed throughout the cross section. These egg-carton shaped interface results in an increase in the surface area of contact between the diamond and the metal carbide substrate. This increase in surface area provides a corresponding increase in the strength of attachment of the diamond layer to the substrate.

The most important aspect of this invention is that the interface between the PCD diamond layer and the metal carbide substrate does not ejaculate in any cross-session to cause abrupt angular changes. As a result, the distribution of internal stress is diffused uniformly within the PCD composite compact, thus reducing the concentration of force at the sharp points in the prior art cutting elements which causes delamination between the polycrystalline diamond table and the substrate and substrate cracking.

FIG. 6A is the cross-sectional view of the substrate of the present invention where the alternating convex and concave surfaces are uniformly distributed throughout the entire mounting surface of the metal carbide substrate.

FIG. 6B is the cross-sectional view of the substrate of the present invention, where only a portion of the mounting surface has the alternating convex and concave features. The periphery of the mounting surface is substantially flat. The mounting surface at the periphery can also slope outwardly and downwardly toward the cutting edge so that the diamond layer is thicker at the periphery than at regions immediately radically inferior to the cutting edge.

The surface topography of the metal carbide substrate can be modified in any number of ways, such as grinding, EDM machining, grit blasting, or performing prior to sintering. However, the humps of the egg-carbon shaped metal carbide substrate should be deep enough in order to spread the stress over a sufficiently thick enough zone to be meaningful and the pattern should have enough humps to uniformly distribute the stress and to increase the surface area of contact between the PCD layer and the metal carbide substrate layer sufficiently to give improved bonding.

The outer surface of the composite compact is comprised mostly of diamond. However, the use of cubic boron nitride and mixtures of diamond and cubic boron nitride can be substituted for the diamond layer in the previous description of the preferred embodiments to produce a compact for applications in which the chemical reactivity of diamond would be detrimental.

The composite is typically manufactured by initially fabricating (e.g., by sintering) a metal carbide substrate having smooth top and bottom surfaces. The substrate may also be performed and sintered. Then, the egg-carton shape is formed in a surface by a suitable cutting and etching process. The substrate is then placed in a conventional press and grains of polycrystalline diamond are applied to the egg-carton shaped surface of the substrate, sufficiently to cover the surface plus create a further layer of grains above the surface. The diamond grains and metal carbide substrate are then subjected to high temperature and high pressure conditions, where upon the grains of diamond are bonded to each other and to the metal carbide substrate to produce a truly integrated mass at the interface between the diamond layer and the metal carbide. The teachings of the pressing are explained, for example in U.S. Pat. No. 3,767,371 issued to Wenfort, Jr., which is incorporated herein as reference.

During the application of heat and pressure in the press, the binder metal, e.g., cobalt, sweeps out of the metal carbide and passes through the diamond by liquid diffusion.

In doing so, the cobalt sinters the diamond grains and occupies pores disposed between the diamond grains. It has been found that the egg-carton shaped interface enables the metal binder to become more uniformly dispersed throughout the mounting surface of the PCD layer. In that regard, it will be appreciated that the presence of the egg-carton shaped interface increases the total contact area between the diamond and metal carbide, thereby increasing the surface area from which the cobalt may flow. Furthermore, the distance by which the cobalt must travel is reduced since the lamented carbide humps project well into the diamond layer. Also, the cobalt is able to flow through the diamond layer in three dimensions rather than in a substantial single direction. Consequently, the metal carbide is more uniformly dispersed throughout the diamond layer. For reasons discussed earlier herein, such uniform dispersion resists the creation of stress concentrations in the diamond layer when the composite is heated or cooled, because the stresses being randomly directed, tend to resist one another and are thus self-balancing.

It will also be appreciated that a composite formed in accordance with the present invention minimizes the thermal stresses occurring between the diamond and metal carbide. In that regard, it will be appreciated that in the case of a prior art composite containing sharp points at the interface between the diamond and metal carbide substrate, the differences in thermal expansion coefficients between those two components creates stresses at the interface, especially at the sharp points. By altering the geometry of the diamond-carbide interface, the present invention eliminates the sharp points which are vulnerable to the stresses. The composite according to the present invention may be considered as comprising three zones, i.e., a zone of diamond, a zone of metal carbide, and an intermediate diamond/metal carbide. The intermediate diamond/metal carbide zone thus has a coefficient of thermal expansion whose value is about halfway between the coefficients of the diamond and metal carbide zones. As a result, the intermediate zone functions as a batter or graded stress interface to minimize the stresses occurring between the diamond and metal carbide zones.

It will thus be appreciated that the present invention significantly alleviates many of the disadvantages commonly occurring heretofore in compositions of the type comprising sharp points at the interface between the diamond and the metal carbide substrate.

While the invention has been illustrated and described in connection with certain preferred embodiments thereof, it will be apparent to those skilled in the art that the invention is not limited thereto. Accordingly, it is intended that the appended claims cover all modifications which are within the true spirit and scope of the invention.

I claim:

1. A cutting element, comprising:
   a polycrystalline material layer; and
   a substrate comprising metal carbide; wherein said polycrystalline material layer and said substrate form interface, said interface comprises a plurality of alternating arc-shaped concaves and convexes.

2. The cutting element of claim 1, wherein the polycrystalline material layer is diamond.

3. The cutting element of claim 1, wherein the polycrystalline material layer is cubic boron nitride.

4. The cutting element of claim 1, wherein the polycrystalline material layer is a mixture of cubic boron nitride and diamond.

5. The cutting element of claim 1, wherein said arc-shaped concaves and convexes are uniformly distributed.

6. The cutting element of claim 1, wherein said interface further comprises an outwardly sloping periphery.

7. The cutting surface of claim 1, wherein said substrate is tungsten carbide.

8. A method for making a cutting element, comprising the steps of:
   (1) forming a substrate of metal carbide having a mounting surface;
   (2) forming a plurality of alternating arc-shaped concaves and convexes on the mounting surface of the substrate;
   (3) covering the mounting surface of the substrate with a layer of diamond grains such that the grains form a solid layer above the substrate; and
   (4) applying heat and pressure to the substrate and diamond grains to cause the diamond grains to adhere to each other and to the substrate.

* * * * *